(12) United States Patent
Dörr et al.

(10) Patent No.: US 11,597,610 B2
(45) Date of Patent: Mar. 7, 2023

(54) METHOD FOR TRANSFERRING AN ITEM TO BE TRANSPORTED FROM AN END POSITION OF A FLOW STORAGE SYSTEM TO A REMOVAL DEVICE

(71) Applicant: Interroll Holding AG, Sant' Antonino (CH)

(72) Inventors: Marcus Dörr, Hückelhoven (DE); Werner Schiller, Hückelhoven (DE)

(73) Assignee: Interroll Holding AG, Sant' Antonino (CH)

( * ) Notice: Subject to any disclaimer, the term of this patent is extended or adjusted under 35 U.S.C. 154(b) by 0 days.

(21) Appl. No.: 17/779,194

(22) PCT Filed: Nov. 27, 2020

(86) PCT No.: PCT/EP2020/083649
§ 371 (c)(1),
(2) Date: May 24, 2022

(87) PCT Pub. No.: WO2021/110553
PCT Pub. Date: Jun. 10, 2021

(65) Prior Publication Data
US 2022/0402704 A1   Dec. 22, 2022

(30) Foreign Application Priority Data

Dec. 2, 2019 (DE) .......................... 102019008379.2

(51) Int. Cl.
*B65G 1/08* (2006.01)
*B65G 43/00* (2006.01)
*B65G 47/88* (2006.01)

(52) U.S. Cl.
CPC .......... *B65G 47/8884* (2013.01); *B65G 1/08* (2013.01); *B65G 43/00* (2013.01)

(58) Field of Classification Search
CPC ....... B65G 1/08; B65G 43/00; B65G 47/8884
(Continued)

(56) References Cited

U.S. PATENT DOCUMENTS 4,228,901 A * 10/1980 Watzka .............. B65G 47/8884
                                                                    209/684
4,541,521 A *  9/1985 Menge ............... B65G 47/8869
                                                                    198/464.2

(Continued)

FOREIGN PATENT DOCUMENTS

DE    2500786 A1   7/1975
DE    3035338 A1   5/1982
(Continued)

*Primary Examiner* — Douglas A Hess
(74) *Attorney, Agent, or Firm* — Michael Soderman

(57) ABSTRACT

The invention relates to a method for transferring an item to be transported from an end portion of a flow storage system to a removal device, comprising the steps of: using an end stop arranged in a shut-off position for retaining at least one first item to be transported on the end portion of the flow storage system and/or using a separator arranged in the shut-off position to retain at least one second item to be transported on a retaining section of the flow storage system; arranging the removal device adjacent to the end portion of the flow storage system in a removal position; using at least one sensor of the removal device for checking whether the end stop and/or the separator is arranged in a shut-off position and transferring the first item to be transported from the end portion to the removal device.

14 Claims, 4 Drawing Sheets

(58) Field of Classification Search
USPC .................... 193/35 G; 198/463.1, 463.4
See application file for complete search history.

(56) References Cited

U.S. PATENT DOCUMENTS

| | | | | |
|---|---|---|---|---|
| 5,048,660 | A * | 9/1991 | Kilper | B65G 13/075 193/35 A |
| 5,641,161 | A * | 6/1997 | Freudelsperger | B65G 1/08 271/103 |
| 6,202,821 | B1 * | 3/2001 | Crockett | B65G 1/08 198/530 |
| 6,557,693 | B1 * | 5/2003 | Freudelsperger | B65G 47/31 198/463.4 |
| 6,640,953 | B2 * | 11/2003 | Brouwer | B65G 47/261 193/35 G |
| 7,219,769 | B2 * | 5/2007 | Yamanouchi | B66F 9/0755 414/641 |
| 7,431,141 | B2 * | 10/2008 | Nadeau | B08B 3/022 198/459.7 |
| 7,510,066 | B2 * | 3/2009 | Goffredo | B65G 1/023 193/35 A |
| 8,714,334 | B2 * | 5/2014 | Yang | B65G 47/8823 198/588 |
| 8,753,060 | B2 * | 6/2014 | Ueda | B65G 35/00 700/214 |
| 9,446,905 | B2 * | 9/2016 | Brockhoff | B65G 35/00 |
| 9,708,123 | B2 * | 7/2017 | Hellenbrand | B65G 47/8815 |
| 11,180,323 | B2 * | 11/2021 | Middelberg | B65G 47/295 |
| 11,383,398 | B2 * | 7/2022 | Bauer | B26D 7/0641 |
| 2010/0290874 | A1 | 11/2010 | Wolkerstorfer | |

FOREIGN PATENT DOCUMENTS

| | | |
|---|---|---|
| DE | 102013101860 A1 | 8/2013 |
| DE | 202018101774 U1 | 4/2019 |
| EP | 1408001 A1 | 4/2004 |
| JP | H0568916 U | 3/1993 |

* cited by examiner

METHOD FOR TRANSFERRING AN ITEM TO BE TRANSPORTED FROM AN END POSITION OF A FLOW STORAGE SYSTEM TO A REMOVAL DEVICE

CROSS REFERENCE TO RELATED APPLICATIONS

This application is the U.S. national stage of International Application No. PCT/EP2020/083649, filed on 2020 Nov. 27. The international application claims the priority of DE 102019008379.2 filed on 2019 Dec. 2; all applications are incorporated by reference herein in their entirety.

BACKGROUND

The invention relates to a method for transferring an item to be transported from a flow storage system to a removal device, to a storage system with at least one flow storage system and at least one removal device and to a use of a sensor arranged on a removal device.

Flow storage systems are known for storing items to be transported. Products, packages, pallets and/or items located on pallets may be stored for example as items to be transported. Gravitational flow storage systems may be used in particular here for storing items to be transported on a slightly inclined storage track. Motorless rollers on which the items to be transported are moved may be arranged for example along the storage track. The inclination of the storage track ensures that, driven by gravitational force, the items to be transported are transported to a lower end portion of the flow storage system. From this (for example lower) end portion, the items to be transported can be transferred one after the other to a removal device, for example to a storage and retrieval machine.

DE 25 00 786 A1 discloses shelf storage systems with a number of pallet storage levels. The levels are inclined. Products can be removed from the individual levels by means of a driverless robot vehicle. Similar devices are also known from US 2010/0290874 A1 and DE 20 2018 101 774 U1.

Specifically when transferring heavy items to be transported, it is known to arrange an end stop on the end portion of the flow storage system. The end stop hinders the items to be transported from falling down in an uncontrolled manner from the end portion of the flow storage system. The use of a separator, which delimits the end portion with respect to the middle of the storage track, is also known. The separator may for example be arranged between a first item to be transported, which is arranged in the end portion, and following items to be transported. The separator prevents a back pressure from following items to be transported on the first item to be transported, which is arranged in the end portion. The separator can prevent following items to be transported from being moved in an uncontrolled manner into the end portion. In this way, reliable removal of the first item to be transported from the end portion of the flow storage system can be made possible without disturbance by items to be transported backing up behind it.

SUMMARY

The invention is based on the object of making the transfer of items to be transported from a flow storage system to a removal device more reliable and using the increased reliability to reduce downtimes of the storage system and/or increase the availability of the storage system.

It may in particular be the object here to make possible a low-cost solution for a reliable transfer of an item to be transported from a flow storage system to a removal device.

This object is achieved by the subject matter of the independent claims. Preferred embodiments are the subject matter of the dependent claims.

DETAILED DESCRIPTION

One aspect concerns a method for transferring an item to be transported from an end portion of a flow storage system to a removal device. In this case, an end stop arranged in an arresting position is used to hold back at least a first item to be transported on the end portion of the flow storage system. Alternatively or additionally, a separator arranged in an arresting position is used to hold back at least a second item to be transported on a retaining portion of the flow storage system. In general terms, at least one retaining means (that is to say for example the end stop and/or the separator) of the flow storage system is used to hold back at least one item to be transported on a storage portion (that is to say for example on the end portion and/or the retaining portion) of the flow storage system.

The removal device is arranged adjacent to the end portion of the flow storage system in a removal position. At least one sensor of the removal device is used to check whether the at least one retaining means, that is to say the end stop and/or the separator, is arranged in its respective arresting position.

Furthermore, the first item to be transported is transferred from the end portion to the removal device.

The individual method steps may, but do not have to, be carried out in the sequence listed above.

The flow storage system may be formed as a flow storage system of the type mentioned at the beginning, that is to say in particular as a gravitational flow storage system. The flow storage system serves for storing items to be transported which can be transferred to the flow storage system and which can in particular also be removed from the flow storage system. The flow storage system may have (for example motorless and/or un-driven) rollers, the roller axes of which may be arranged parallel to one another, in line and/or in one plane. The rollers may in this case form a storage track on which the items to be transported are stored and/or moved. In this case, the upper sides of the roller casings of these rollers may define a storage level of the flow storage system on which the items to be transported are stored in the flow storage system. The end portion of the flow storage system is formed as an intermediate store for the item to be transported that is intended to be removed next from the flow storage system. In this case, the end portion may be formed at one end of the flow storage system. The end portion is formed at least of such a size that the first item to be transported can be stored completely within and/or on the first end portion. The end portion may in particular be formed at the lower flow storage system end of a gravitational flow storage system. The end stop may be arranged directly at the end of the flow storage system that may be identical to the end of the end portion, i.e. for example at the lower end of the end portion. At the end portion, items to be transported can be removed from the flow storage system.

In an alternative embodiment, the end portion may also be formed for storing two or more items to be transported, which are for example removed from the flow storage system simultaneously and/or in the same working step.

Here it is also possible for a receptacle of the removal device to be formed for simultaneously receiving a number of items to be transported.

The retaining means, that is to say for example the end stop and/or the separator, may be movable between an arresting position and a releasing position. In the arresting position, the retaining means may be arranged at least partially above the storage level, and thus prevent or at least hinder the conveyance along the flow storage system of the directly adjoining and/or moved-up item to be transported. Thus, for example, the end stop can in its arresting position prevent conveyance of the first item to be transported beyond the (for example lower) end of the flow storage system. The separator can in its arresting position prevent conveyance of the second item to be transported into the end portion.

In the releasing position, the retaining means may be arranged under and/or to the side of the storage level of the flow storage system and thus allow the conveyance and/or movement of the directly adjoining item to be transported beyond the retaining means. Thus, for example, the end stop can in its releasing position allow the conveyance and/or movement of the first item to be transported beyond the (for example lower) end of the flow storage system. Equally, the separator can in its releasing position allow the conveyance and/or movement of the second item to be transported from the retaining portion into the end portion.

The retaining portion may be arranged adjacent to the end portion. In this case, the separator may be arranged at a limit and/or a transition between the end portion and the retaining portion of the flow storage system. The retaining portion may in this case extend over the entire remaining flow storage system with the exception of the end portion.

The at least one sensor of the removal device is used for increasing the reliability and for checking whether the transfer process is taking place correctly. The sensor may be formed on the removal device and/or as part of the removal device. The sensor may in particular be electrically supplied by way of the removal device. The sensor is used for checking whether the end stop and/or the separator is arranged in its respective arresting position. In this case, the sensor may possibly also be used for checking whether the end stop and/or the separator is arranged in its respective releasing position. The sensor may be formed as an electronic sensor and interact with the end stop and/or the separator. As an electronic sensor, the sensor may in this case be supplied with power by way of the removal device.

The sensor may be formed in a multipart manner and/or comprise a number of sensor elements. For example, at least a first sensor element may interact with the end stop and at least a second sensor element may interact with the separator.

Depending on the embodiment, the flow storage system may have either only an end stop and no separator, only a separator and no end stop or else both an end stop and a separator. What is more, the flow storage system may have further retaining means with which the sensor can interact. Preferably, the flow storage system has both an end stop and a separator, whereby a very reliable transfer of the first item to be transported can be made possible.

The checking of the position of the end stop and/or of the separator may be used to increase the reliability of the process when transferring the first item to be transported. For example, before opening the end stop, that is to say before releasing the first item to be transported, it may be checked whether the separator is arranged in its respective arresting position. It can in this way be avoided that more items to be transported than are planned, that is to say for example more than only the first item to be transported, are moved to the removal device if there is a wrongly positioned separator. If specifically too many items to be transported are moved to the removal device in an uncontrolled manner, this can lead to an accident, personal injury and/or device failure. This situation can be avoided by the check.

Furthermore, a check of the arresting position of the end stop may take place before the removal device is moved away out of its removal position. This check of the end stop may take place in particular after the transfer of the first item to be transported to the removal device. This check can also have the effect of avoiding an accident in which items to be transported slip from the flow storage system in an uncontrolled manner after the removal device is moved away from the end portion.

The removal device may for example be formed as a storage and retrieval machine, which can for example receive and transport away from the flow storage system precisely one item to be transported or a precisely predetermined number of items to be transported. What is more, the removal device may also be formed to transfer an item to be transported to the flow storage system.

The removal device may be movably formed and be moved from its removal position into other positions. In this case, the removal position is that position of the removal device in which it can receive an item to be transported from the end portion of the flow storage system. In this case, the removal device may be arranged adjacent to the end portion. Furthermore, a receptacle of the removal device may in this case be arranged substantially as an extension of the (end portion of the) flow storage system. In this case, the receptacle of the removal device may have the same inclination as the flow storage system and in particular form a substantially stepless transition with the flow storage system. In the removal position, the first item to be transported can be moved directly from the end portion to the removal device when the end stop opens. This movement may be brought about for example exclusively in a gravitation-driven manner. The removal device may be formed for the removal of items to be transported from a number of flow storage systems.

The sensor of the removal device is used to increase the reliability of the process. In this case, the positioning of the sensor on the removal device makes it possible to make the flow storage system itself sensorless, in particular without an electrical sensor. This obviates the need to provide the flow storage system itself with a power source. Thus, a purely mechanical flow storage system, which interacts with a removal device, for example a power-operated removal device, may be used for storing the items to be transported. In this case, the electrical supply to the removal device may be completely sufficient to increase the reliability of the process without having to arrange and/or form electrical sensors and/or other sensors on the flow storage system itself.

This provides a low-cost possibility for making the transfer of an item to be transported from a flow storage system to a removal device reliable.

In one embodiment, the sensor of the removal device is formed as a light sensor, which emits and/or receives a light signal. Here, the sensor may have in particular at least one photodetector and/or photosensor. Furthermore, here the sensor may have at least one light source, such as for example an LED, with which the light signal can be emitted. The sensor may be formed for example as a kind of light barrier.

In a development of this embodiment, the light signal emitted by the sensor is reflected at a reflecting means of the end stop and/or of the separator precisely whenever the associated end stop and/or separator is arranged in its arresting position. A reflector, mirror and/or metal part at a predetermined position on the end stop and/or separator may be formed for example as the reflecting means. The predetermined position may in this case be chosen such that the reflecting means is arranged in the light path of the sensor and reflects the light signal precisely whenever the end stop and/or the separator is arranged in its arresting position and the removal device is in its removal position. The removal position is a fixed-predetermined and/or adjusted position of the removal device, the assuming of which also meaning that the alignment of the sensor is predetermined and/or adjusted. The light signal thus reflected can be received by the sensor. By emitting and receiving the light signal, it can be checked here whether the end stop and/or the separator is arranged in its respective arresting position. Here, the sensor may in particular have a first light sensor for interacting with a first reflecting means of the end stop and a second light sensor for interacting with a second reflecting means of the separator. The use of a light sensor can thus provide a particularly efficient and/or effective possibility for checking both the arresting position of the end stop, which is arranged relatively close to the removal device itself, and the arresting position of the somewhat more remote separator.

In one embodiment, the first item to be transported is only transferred from the end portion to the removal device whenever a separator check shows that the separator is arranged in its arresting position, in which it holds back at least the second item to be transported on the retaining portion. Here, the check of the arresting position of the separator, that is to say the separator check, takes place before the transfer of the first item to be transported to the removal device. It is ensured by the separator check that the second item to be transported and possibly further items to be transported are reliably held back on the retaining portion before the first item to be transported is transferred to the removal device. In this way, uncontrolled slipping of the second item (and possibly further items) to be transported onto the end portion and/or onto the removal device can be avoided and/or reduced.

According to one embodiment, the removal device is only moved away out of its removal position whenever an end stop check shows that the end stop is arranged in its arresting position. Here, the end stop check, that is to say the check of the arresting position of the end stop, takes place after the transfer of the first item to be transported to the removal device. As a result, the transfer has consequently already taken place before the end stop check. Before the removal device is moved away from the flow storage system, however, that is to say is moved away out of its removal position, first it is checked by means of the sensor that the end stop is in its arresting position. In this way it can be prevented that the second item to be transported and/or further items to be transported slip from the flow storage system in an uncontrolled manner when the removal device is moved away.

In a development of this embodiment, the removal device is only moved away out of its removal position whenever an additional separator check shows that the separator is also arranged in its arresting position, in which it holds back at least the second item to be transported on the retaining portion. In this way, the operating reliability can be increased still further.

In an additional or alternative development of the embodiment, the end stop check includes both an evaluation of a received light signal and a mechanical check of the arresting position of the end stop. The evaluation of the light signal may take place by means of the sensor of the removal device. The mechanical check of the arresting position as the end position of the end stop may take place by actuating an electrical, pneumatic and/or hydraulic actuator for closing the end stop. This actuation may preferably be performed in a displacement-controlled manner. For this purpose, in particular a combination of an actuator with a toggle lever mechanism may be used, in order in this way to bring the end stop into its end position.

In the case of the method, it may be provided that a failed check leads to an error message, by which an operator is warned of an error relevant to safety. In this case, the method may be interrupted by the error message until an operator has checked that the end stop and/or the separator are functioning correctly and the transfer can be continued.

In one embodiment, the removal device is formed as a storage and retrieval machine and/or a robot and/or a transfer car. The removal device may be formed here in particular by an autonomous controller. The controller may be assigned the task of fetching the first item to be transported from the flow storage system. In this case, the removal device may autonomously control how it moves into the removal position. Furthermore, the controller may control the transfer and/or the check(s) in an open-loop and/or closed-loop manner.

According to one embodiment, the flow storage system is formed as a gravitational flow storage system and/or as a mechanical flow storage system and/or free from electronic sensors. In this case, the flow storage system may be formed without further drives (apart from the gravitational force) which control the position of the items to be transported. In particular, the flow storage system may be formed without electronic sensors, i.e. not have any electronic sensors. This makes it possible to reduce costs by forming the flow storage system without a power supply, the flow storage system being able to operate without motors, without electrical sensors and/or even without light.

In one embodiment, a controller of the removal device controls at least one of the following activities in an open-loop and/or closed-loop manner:
 the transfer of the first item to be transported from the end portion to the removal device;
 the control of the sensor;
 the checking of the arresting position of the end stop and/or of the separator;
 a movement of the end stop into its arresting position and/or into its releasing position; and/or
 a movement of the removal device.

The control of the removal device may in this case additionally control one or more of the following activities in an open-loop and/or closed-loop manner:
 a setting of an inclination of the receptacle of the removal device; and/or
 actuation of an actuator of the removal device; and/or
 a check of the position of the actuator of the removal device.

The controller may in this case have a processor and/or program codes for controlling at least one of the activities listed above in an open-loop and/or closed-loop manner. Preferably, the controller controls all of the activities listed above in an open-loop and/or closed-loop manner, in order to make possible a transfer that is almost completely controlled and/or carried out by the removal device. When transferring the first item to be transported to the removal device, the controller may for example trigger a movement of the end stop from the arresting position into its releasing position. This may take place once the sensor has been activated by way of the controller such that the arresting position of the end stop and/or of the separator has been checked. The result of the check may be evaluated by the controller and used as a basis for moving the end stop from its arresting position into its releasing position. After the transfer, the controller may control a check of the end stop in an open-loop and/or closed-loop manner, that is to say a check as to whether the end stop is arranged in its arresting position again. The controller may include a movement controller for moving the removal device out of the removal position and/or into the removal position. Additionally or alternatively, the controller may communicate with a central controller. The controller may for example notify the central controller that the first item to be transported has been successfully transferred from the end portion to the removal device and/or output an error message after a failed check.

In one embodiment, the method additionally has the following steps:

moving the end stop from its arresting position into a releasing position, in which it no longer holds back the first item to be transported on the end portion, and/or moving the separator from its arresting position into a releasing position, in which it no longer holds back the second item to be transported on the retaining portion, so that the second item to be transported can be moved into the end portion.

In one embodiment, the actuation and/or movement of the separator is coupled to the movement and/or actuation of the end stop in such a way that a maximum of only one of the two stops can be arranged in its respective releasing position.

This means that either only the end stop is arranged in the releasing position, and at the same time the separator must be arranged in the arresting position, or only the separator is arranged in its releasing position, and at the same time the end stop must be arranged in the arresting position.

In one embodiment, a scanner of the removal device checks
whether the first item to be transported is arranged in the end portion and/or
whether the removal device is ready for receiving the first item to be transported.

The scanner may be formed on the removal device and/or as part of the removal device. The scanner may in particular be electrically supplied by way of the removal device. Generally, any desired detector with the aforementioned functions may be used as a scanner. In the removal position of the removal device, the scanner may be aligned in such a way that a first part (for example approximately a first half) of its detection field lies in the end portion and a second part (for example approximately a second half) of its detection field lies in a receptacle of the removal device. Thus, it can be checked by a scanner before the opening of the end stop whether the first item to be transported is arranged in the end portion and/or whether the removal device is free, i.e. ready for receiving the first item to be transported. Alternatively, two or more separate scanners may be used for this, whereby however the expenditure on components is increased. The reliability of the transfer process is also increased by this check.

One aspect concerns a storage system with at least one flow storage system for storing items to be transported and at least one removal device for receiving at least one item to be transported that is stored in an end portion of the flow storage system. In this case, an end stop can be arranged in an arresting position, in which it holds back at least a first item to be transported on the end portion, and/or a separator can be arranged in an arresting position, in which it holds back at least a second item to be transported on a retaining portion of the flow storage system. In general terms, at least one retaining means (that is to say for example the end stop and/or the separator) of the flow storage system can in this case be arranged in an arresting position, in which it holds back at least one item to be transported on a storage portion (that is to say for example on the end portion and/or the retaining portion) of the flow storage system. Furthermore, the first item to be transported can be transferred from the end portion of the flow storage system to the removal device located in its removal position.

The use of the sensor may be carried out in particular within the scope of the aspect of the invention described at the beginning. For this reason, all of the statements made in connection with the method and/or the storage system also concern the use, and vice versa.

Within the scope of this invention, the terms "substantially" and/or "approximately" may be used so as to include a deviation of up to 5% from a numerical value following the term, a deviation of up to 5° from a direction following the term and/or from an angle following the term.

Unless otherwise specified, terms such as at the top, at the bottom, above, below, laterally, etc. relate to the reference system of the Earth in an operating position of the subject matter of the invention.

The invention is described in more detail below on the basis of exemplary embodiments shown in figures. Here, identical or similar reference signs may identify identical or similar features of the embodiments. Individual features shown in the figures may be implemented in other exemplary embodiments.

DETAILED DESCRIPTION OF THE PREFERRED EMBODIMENTS

Figure 1:
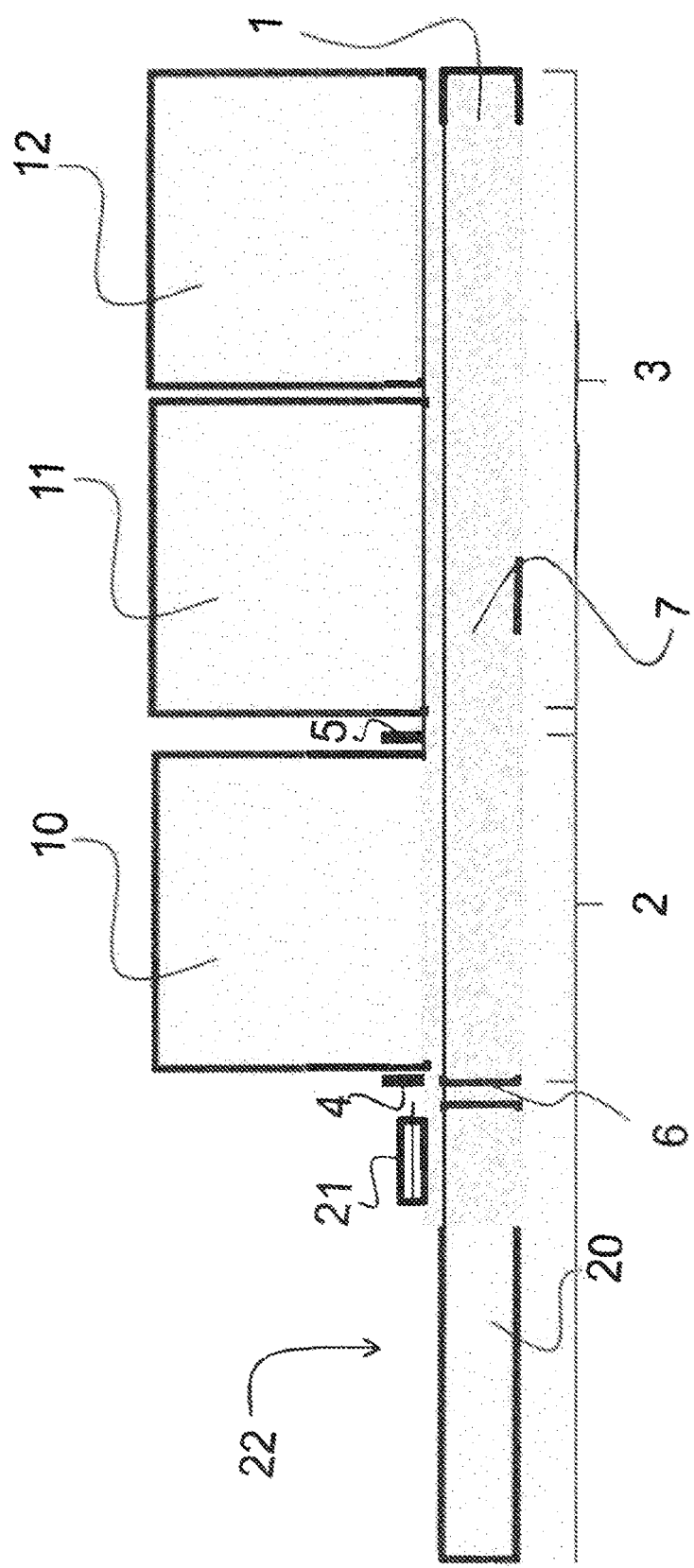
FIG. 1 shows a schematic representation of a storage system with a flow storage system and a removal device when transferring an item to be transported.

FIG. 1 shows a schematic representation of a storage system with a flow storage system 1 and a removal device 20 in a side view. The flow storage system 1 is formed as a gravitational flow storage system and has a storage track 7, which is arranged with an inclination in the reference system of the Earth. The storage track 7 may have a plurality of rollers (not shown in the figure), which are arranged in a frame and are arranged with parallel roller axes in line one behind the other in one plane. A plurality of items to be transported 10, 11 and 12 are stored on the storage track 7. Driven by gravitation, the items to be transported 10, 11 and 12 are moved automatically on the (for example motorless) rollers to the lower end 6 of the flow storage system.

The storage track 7 has in this case at least one end portion 2, arranged at the lower end 6 of the flow storage system, and a retaining portion 3 adjoining it. In this case, the end portion 2 may be formed as an unloading portion of the flow storage system 1, from which the items to be transported 10, 11, 12 are unloaded from the flow storage system 1. On the flow storage system 1, a first item to be transported 10 is arranged in the end portion 2. A second item to be transported 11 and a third item to be transported 12 are arranged in the retaining portion 3. It must be noted in this respect that FIG. 1 only schematically shows an exemplary embodiment. An actual flow storage system 1 may have a much longer storage track 7, so that significantly more (or else fewer) items to be transported may also be stored and/or arranged in the retaining portion 3. In the exemplary embodiment shown, precisely one item to be transported is arranged in the end portion 2, to be specific the first item to be transported 10. The length of the end portion 2 (in the direction of extent of the storage track 7 in which the storage track 7 is inclined) may be substantially the length of the first item to be transported 10 (in the same direction). This length may for example correspond to the length of a pallet, for example the length of a Euro-pallet. In this case, the end portion 2 may actually be formed as slightly longer than the first item to be transported 10, for example from approximately 1% longer to approximately 50% longer, preferably from approximately 4% to approximately 20% longer. In this way, the end portion 2 can reliably and completely receive the first item to be transported 10 even if it is arranged on the storage track 7 in a slightly turned state.

The flow storage system 1 may be formed for receiving items to be transported of a standardized and/or uniform length (in the direction of extent of the storage track 7 in which the storage track 7 is inclined), for example for receiving pallets. At the lower end 6 of the flow storage system, the end portion 2 is delimited by an end stop 4. The end stop 4 is movable between an arresting position, in which it holds back the first item to be transported 10, and a releasing position, in which the first item to be transported 10 can be moved beyond the end stop 4. Arranged at the opposite end of the end portion 2 is a separator 5. The separator 5 is arranged between the first item to be transported 10 and the second item to be transported 11. The separator 5 is formed as a limit between the end portion 2 and the retaining portion 3. The separator 5 holds back the second item to be transported 11 and prevents conveying and/or moving of the second item to be transported 11 beyond the retaining portion 3 into the end portion 2. In this case, the separator 5 can hold back by means of the second item to be transported 11 both the third item to be transported 12 and also further items to be transported that are not shown in the schematic figure and follow thereafter. The separator 5 can also be moved between an arresting position and a releasing position. It is known in principle to mechanically couple the separator 5 to the end stop 4. Such a coupling can bring about the effect that the separator 5 is temporarily moved from the arresting position into the releasing position once the end stop 4 has returned from the releasing position into its arresting position. This allows the second item to be transported 11 to move up into the end portion 2 after removal of the first item to be transported 10 by the removal device 20.

The removal device 20 has a receptacle 22, which in the removal position shown in FIG. 1 of the removal device 20 is arranged as an extension of the flow storage system 1 adjoining the end 6 of the flow storage system and/or adjoining the end portion 2. In this case, the removal device 20 in its removal position is arranged and aligned in such a way that the first item to be transported 10 is transported from the end portion 2 directly to the receptacle 22 of the removal device 20 when the end stop 4 is open. The removal device 20 may have further side limitations and/or end limitations (not shown), which prevent and/or reduce slipping down of the first item to be transported 10 out of the receptacle 22. The removal device 20 has a sensor 21. The sensor 21 may be formed as a kind of light barrier and/or a light sensor, which can emit a light signal in such a way that it is reflected by the end stop 4 and/or the separator 5 as long as the end stop 4 and/or the separator 5 is arranged in its respective arresting position. The sensor 21 is formed for checking the position of the end stop 4 and/or of the separator 5. For this purpose, the end stop 4 and/or the separator 5 may have a reflector, which only reflects the light signal emitted by the sensor 21 to a detector of the sensor 21 whenever the end stop 4 and/or the separator 5 is arranged in its respective arresting position.

The sensor 21 may be formed in a multipart manner. For example, it may have a first light source for interacting with the end stop 4 and a second light source for interacting with the separator 5. The two light sources may be formed for respectively emitting a light signal in the direction of the end stop 4 and/or in the direction of the separator 5. Furthermore, the sensor 21 may have one or two detectors, for example photodetectors. In this case, a first detector may be configured such that it detects a light signal reflected by the end stop 4 and a second detector may be configured such that it detects a light signal reflected by the separator 5. The reflector of the separator 5 (and also of the end stop 4) may be arranged at a, for example, lateral position of the storage track 7 such that it can interact with the sensor 21 past the first item to be transported 10. Consequently, the first item to be transported 10 does not cover the reflector of the separator 5.

The storage system shown in FIG. 1 may have one or more flow storage systems 1 and one or more removal devices 20. Preferably, the storage system has a number of flow storage systems 1, the storage tracks 7 of which are for example arranged parallel to one another and/or one above the other, and which are unloaded by at least one removal device 20. The storage system shown in FIG. 1 offers possibilities for checking the arresting position of the end stop 4 and/or of the separator 5 and consequently makes it possible to increase the reliability of the process when transferring items to be transported from the flow storage system 1 to the removal device 20.

Figure 2:
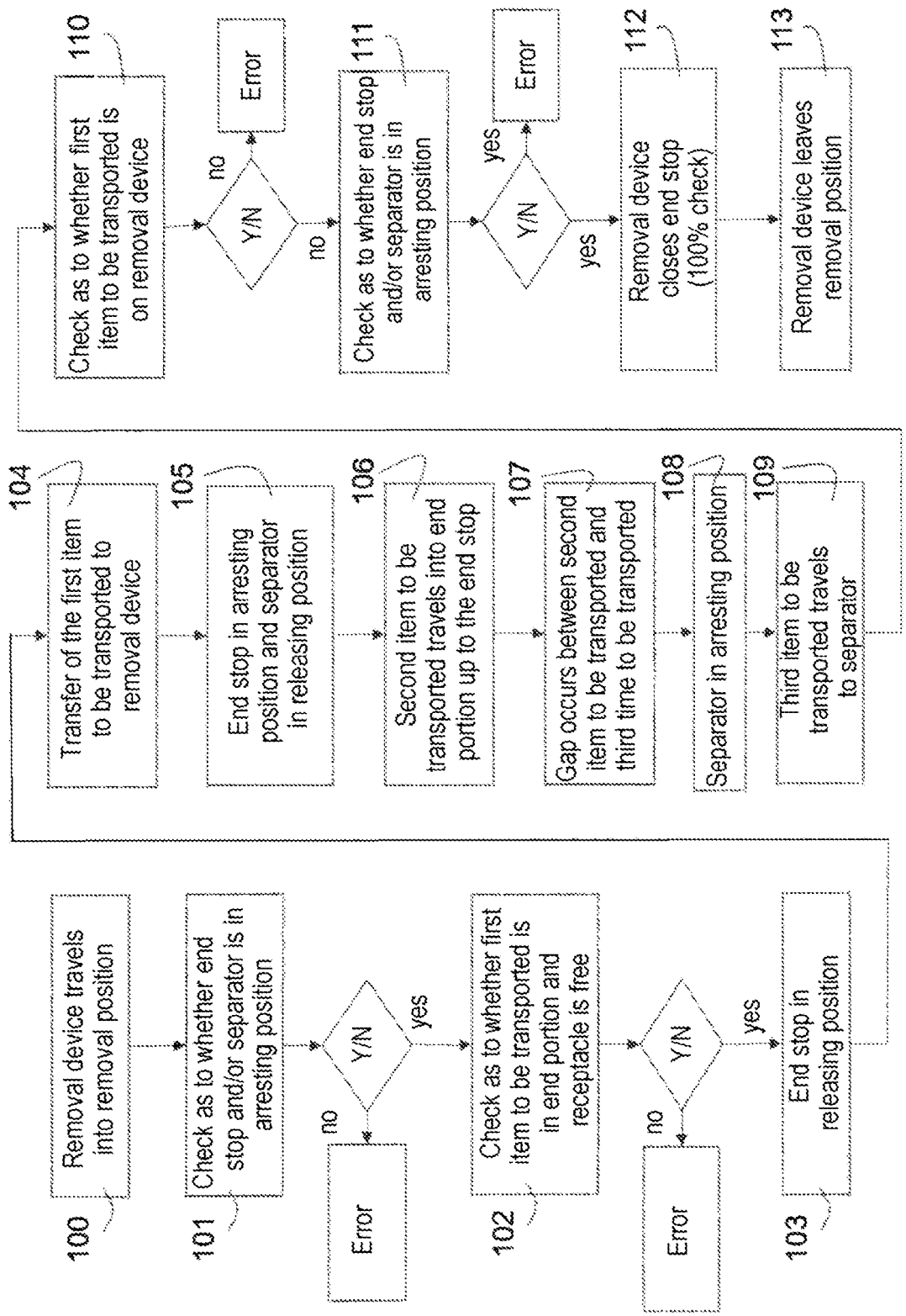
FIG. 2 shows a flow diagram of an exemplary embodiment of a method for transferring an item to be transported.

FIG. 2 shows in a flow diagram an exemplary embodiment of a method for transferring an item to be transported from a flow storage system to a removal device. The method may be carried out for example by means of the storage system shown in FIG. 1. For the sake of clarity, in the following reference is largely made to the reference signs of the storage system shown in FIG. 1. The method according to the flow diagram shown in FIG. 2 may however also be carried out with slightly differently configured storage systems.

The method begins with step 100, in which the removal device 20 is moved and/or travels into its removal position. In the removal position, the receptacle 22 may be arranged as an extension of the end portion 2 of the flow storage system 1.

In the removal position, a check as to whether the end stop 4 and/or the separator 5 is respectively arranged in its arresting position takes place in step 101. Preferably, both a check of the arresting position of the end stop 4 and a check of the arresting position of the separator 5 take place. For this purpose, the sensor 21 may be used as described above. If at least one retaining means, that is to say for example the end stop 4 or the separator 5, is not arranged in the arresting position, an error message may be output.

If the check shows correct positioning of the end stop 4 and/or of the separator 5 in the arresting position, the check as to whether the first item to be transported 10 is arranged in the end portion 2 and/or whether the receptacle 22 is free, and consequently ready for receiving the first item to be transported 10, takes place in step 102. This check may be carried out by means of a scanner of which the field of view is directed partially on the end portion 2 and partially on the receptacle 22. Alternatively, some other detector may be used, for example two or more scanners and/or at least one camera for image evaluation. If the end portion 2 and/or the receptacle 22 is wrongly occupied, an error message takes place.

If the check shows correct space occupancy, a movement of the end stop 4 into its releasing position takes place in step 103. This opening of the end stop 4 may be triggered and/or caused by the removal device 20. For example, a controller of the removal device 20 may actuate a mechanical and/or electromagnetic trigger for moving the end stop 4 from its arresting position into its removal position. This may involve releasing a locking of the end stop 4 which secures the end stop 4 in its arresting position.

The transfer of the first item to be transported 10 to the removal device 20 subsequently takes place in step 104. In this case, the first item to be transported 10, driven by gravitation alone, may be moved from the end portion 2 by way of the end stop 4 arranged in the releasing position to the receptacle 22 of the removal device 20.

A movement of the end stop 4 from its releasing position into its arresting position and a movement (for example coupled thereto) of the separator 5 from its arresting position into its releasing position subsequently take place in step 105. These two movements may take place purely mechanically and/or automatically. Thus, the time for which the end stop 4 remains in its releasing position may be preset, for example by activation by means of an egg timer and/or some other retaining means. Alternatively or additionally, a detector and/or trigger (such as for example a mechanical pressure plate as a pedal sensor) may be used to detect that the end portion 2 is free and the end stop 4 can close again. The end stop 4 may also be configured such that it already returns to its arresting position just because it is no longer subjected to the load of the first item to be transported 10 sliding over it.

A spring-mounted pedal sensor, which is arranged in the end portion 2 and may be formed as a purely mechanical sensor, is used particularly advantageously. The pedal sensor can check whether the end portion 2 is free. Only if the pedal sensor confirms the free state of the end portion 2 does the separator 5 open, the latter moving from its arresting position into its releasing position. Here, the end stop 4, the separator 5 and/or the pedal sensor may be mechanically coupled to one another.

Subsequently, in step 106, the second item to be transported 11 travels beyond the separator 5 from the retaining portion 3 into the end portion 2 up to the end stop 4, which is arranged in its arresting position.

In this case, in step 107, a gap between the second item to be transported 11 and the third item to be transported 12 opens up on account of the inertia of the items to be transported 11, 12.

This gap is used in step 108 for the separator 5 between the second item to be transported 11 and the third item to be transported 12 to move from its releasing position into its arresting position. This movement of the separator 5 may also take place in a purely automatic and/or mechanically triggered manner.

In step 109, the third item to be transported 12 travels to the separator 5. Consequently, the third item to be transported 12 and possibly further items to be transported that are stored on the flow storage system 1 are held back in the retaining portion 3 by the separator 5, whereas the second item to be transported 11 has moved up into the end portion 2.

In step 110, a check takes place as to whether the first item to be transported 10 has been received by the removal device 20, that is to say in particular whether it has arrived on the receptacle 22. This may for example take place again by the scanner and/or detector described above, but also for example by a pedal sensor, gravitation sensor, and/or image recognition. If an error is established in step 110, this error is output.

Otherwise, a check as to whether the end stop 4 and/or the separator 5 is respectively arranged in its arresting position takes place in step 111. As already in step 101, this check may also take place by means of the sensor 21. Preferably, a check of the arresting position of the end stop 4 and of the separator 5 takes place both in step 101 and in step 111. Possibly, in method step 101 just a check of the position of the separator 5 may already be sufficient and/or in method step 111 just a check of the arresting position of the end stop 4. However, the reliability of the process is further increased if the arresting positions of the two retaining means 4, 5 are checked in both method steps 101 and 111.

If there is no error and no error is output, a second check of the arresting position of the end stop 4 takes place in step 112 by a closing, for example mechanical closing, of the end stop 4 carried out by the removal device 20. This may take place as part of a "100% check". In this way it is ensured that the end stop 4 is secured and/or latched in its arresting position even whenever it was previously not yet completely arranged in its arresting position. This is because the case may occur where the check carried out in step 111 by means of the sensor 21 does not ensure 100% reliability with respect to the arresting position of the end stop 4 and/or of the separator 5. This is so because the check in step 111 by means of the sensor 21 could theoretically also confirm the arresting position of the end stop 4 even when, although it is almost arranged in its arresting position, it is however not yet secured and/or latched there. If specifically the end stop 4 is not correctly latched in its arresting position, but for example the reflector of the end stop 4 has already penetrated into the path of the light signal from the sensor 21, the check in method step 111 may have been positively completed even though the end stop 4 is not yet secured. This problem is solved by the method step 112, in which reliable mechanical closing of the end stop 4 takes place (as a 100% check).

Only when the arresting position of the end stop 4 has consequently been checked twice does the removal device 20 leave its removal position in method step 113, it being able to take along the first item to be transported 10 and bring it to its destination. The method can be ended in this way.

Subsequently, the second item to be transported 11, then arranged in the end portion 2, may be removed next, for example by means of the same method, the second item to be transported 11 then taking the place of what was previously the first item to be transported and the third item to be transported 12 taking the place of what was previously the second item to be transported, etc. The method can consequently be carried out repeatedly, for example until the flow storage system 1 has been emptied.

In the method, the positions of the end stop 4 and/or of the separator 5 are checked by means of the sensor 21 of the removal device 20. In this way, the reliability of the process is increased without the flow storage system 1 itself having to be equipped with electronic sensors. This makes it possible to use just one removal device 20 connected to an electrical power source to serve one or more flow storage systems 1, which may be formed completely independently of power sources, and consequently unelectrified. In this way, the reliability of the process can be increased by means of a low-cost and/or cost-efficient sensor deployment.

The method may have more than steps 100-113 shown in FIG. 2.

Furthermore, in some embodiments one or more of steps 100-113 may be omitted, such as for example step 102 and/or 110 and/or 112 and/or steps 106-109. Individual method steps may be modified and/or supplemented within the scope of the invention.

Figure 3:
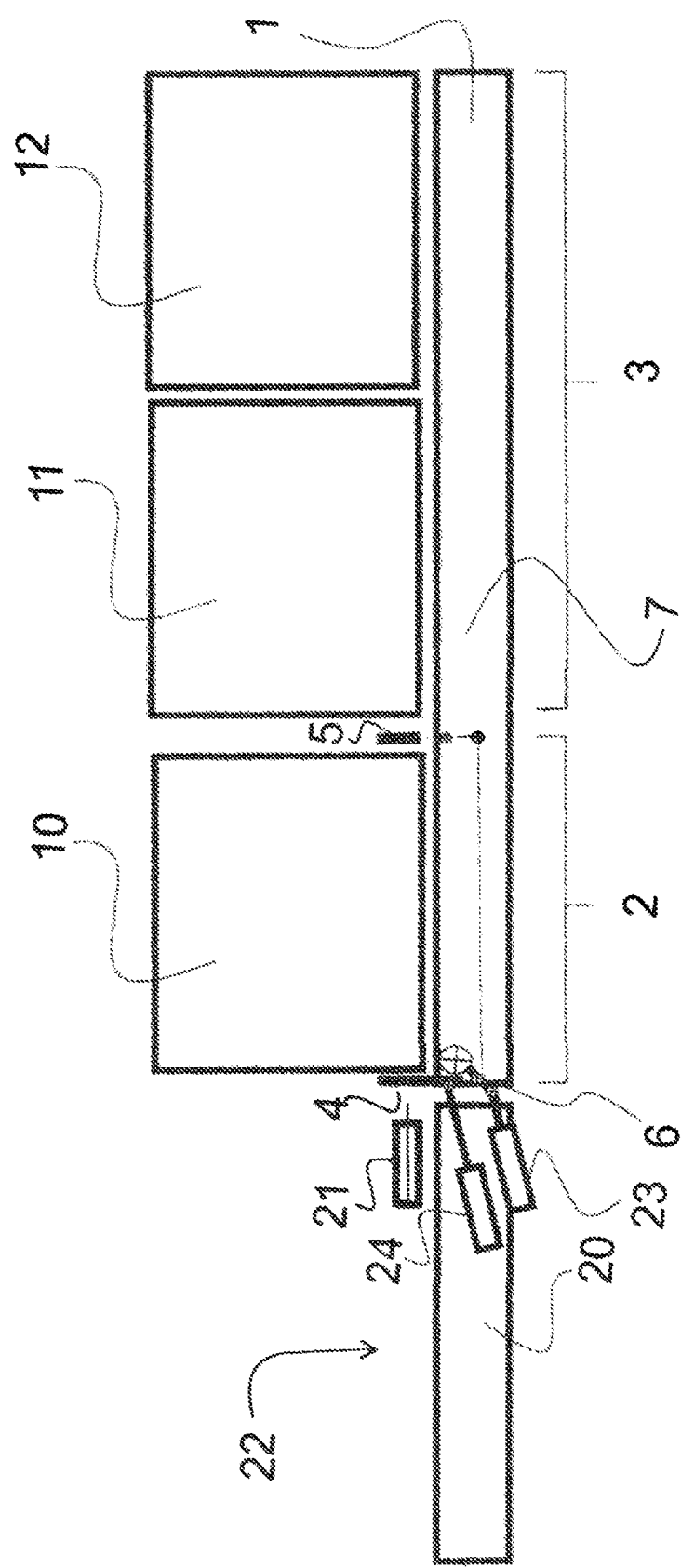
FIG. 3 shows a schematic representation of a storage system with a flow storage system and a removal device when the end stop is closed.
Figure 4:
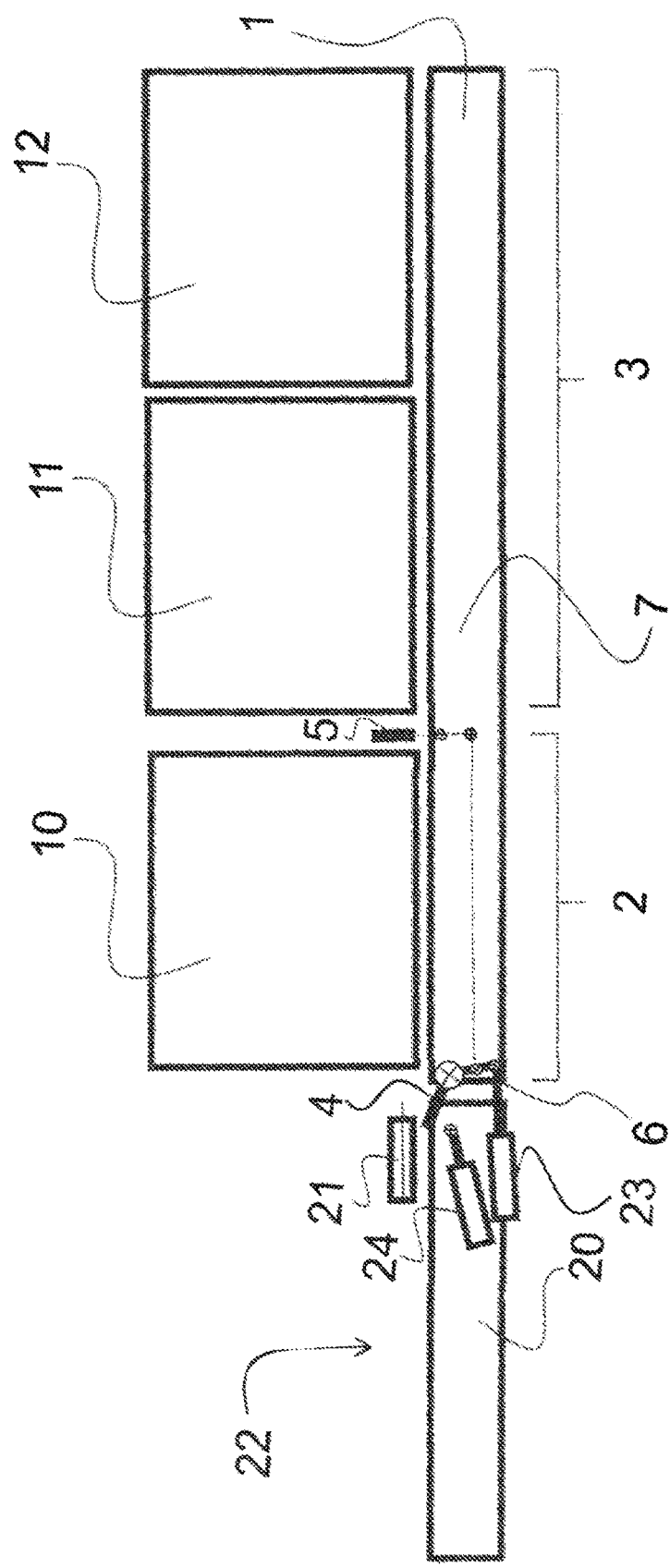
FIG. 4 shows a schematic representation of the storage system shown in FIG. 3 when the end stop is open.

FIGS. 3 and 4 respectively show in a schematic representation the storage system already shown in FIG. 1, with the flow storage system 1 and the removal device 20. The removal device 20 has in this case a first actuator 23, which may be formed for example as a toggle lever. The first actuator 23 is formed for opening the end stop 4, in particular by a mechanical, electrical, pneumatic and/or hydraulic actuation. For this purpose, the first actuator 23 may have a toggle lever, by means of which the end stop 4 can be moved precisely whenever the removal device 20 is arranged in its removal position. The first actuator 23 may be formed in a displacement-controlled manner.

The first actuator 23 may furthermore also be formed for closing the end stop 4, i.e. to move the end stop 4 from its releasing position into its arresting position. As an alternative to this, the removal device 20 may have a second actuator 24, to close the end stop 4 mechanically, i.e. for example to press it closed. The second actuator 24 may move the end stop 4 for example by a mechanical, electrical, pneumatic and/or hydraulic actuation. The second actuator 24 may be formed as a pure closing actuator, whereas the first actuator 23 may be formed either as a pure opening actuator or as an opening and closing actuator.

FIG. 3 shows the end stop 4 in its closed position, i.e. in its arresting position.

FIG. 4 shows the end stop 4 in its opened position, i.e. in its releasing position.

LIST OF REFERENCE NUMERALS

1 Flow storage system
2 End portion
3 Retaining portion
4 End stop
5 Separator
6 End of the flow storage system
7 Storage track
10 First item to be transported
11 Second item to be transported
12 Third item to be transported
20 Removal device
21 Sensor
22 Receptacle
23 First actuator
24 Second actuator

The invention claimed is:

1. A method for transferring an item to be transported (10; 11; 12) from an end portion (2) of a flow storage system (1) to a removal device (20) with the steps of:
using an end stop (4), arranged in an arresting position, for holding back at least a first item to be transported (10) on the end portion (2) of the flow storage system (1) and/or
using a separator (5), arranged in an arresting position, for holding back at least a second item to be transported (11) on a retaining portion (3) of the flow storage system (1);
arranging (100) the removal device (20) adjacent to the end portion (2) of the flow storage system (1) in a removal position;
using at least one sensor (21) of the removal device (20) for checking (101; 111) whether the end stop (4) and/or the separator (5) is arranged in its respective arresting position; and
transferring (104) the first item to be transported (10) from the end portion (2) to the removal device (20).

2. The method as claimed in claim 1,
wherein the sensor (21) of the removal device (20) is formed as a light sensor, which emits and/or receives a light signal.

3. The method as claimed in claim 2,
wherein the light signal emitted by the sensor (21) is reflected at a reflecting means of the end stop (4) and/or of the separator (5) precisely whenever the associated end stop (4) and/or separator (5) is arranged in its arresting position.

4. The method as claimed in claim 1,
wherein the first item to be transported (10) is only transferred from the end portion (2) to the removal device (20) whenever a separator check (101) shows that the separator (5) is arranged in its arresting position, in which it holds back at least the second item to be transported (11) on the retaining portion (3).

5. The method as claimed in claim 1,
wherein the removal device (20) is only moved away out of its removal position whenever an end stop check (111; 112) shows that the end stop (4) is arranged in its arresting position.

6. The method as claimed in claim 5,
wherein the removal device (20) is only moved away out of its removal position whenever an additional separator check (111) shows that the separator (5) is also arranged in its arresting position.

7. The method as claimed in claim 5,
wherein the end stop check (111; 112) includes both an evaluation of a received light signal and a mechanical check of the arresting position of the end stop (4).

8. The method as claimed in claim 1,
wherein the removal device (20) is formed as a storage and retrieval machine and/or a robot and/or a transfer car.

9. The method as claimed in claim 1,
wherein the flow storage system (1) is formed as a gravitational flow storage system and/or as a mechanical flow storage system and/or free from electronic sensors.

10. The method as claimed in claim 1,
wherein a controller of the removal device (20) controls at least one of the following activities in an open-loop and/or closed-loop manner:

the transfer (104) of the first item to be transported (10) from the end portion (2) to the removal device (20);

the control of the sensor (21);

the checking (101; 111) of the arresting position of the end stop (4) and/or of the separator (5);

a movement (103; 112) of the end stop (4) into its arresting position and/or into its releasing position; and/or a movement (100; 113) of the removal device (20).

11. The method as claimed in claim 1, with the steps of:

moving (103) the end stop (4) from its arresting position into a releasing position, in which it no longer holds back the first item to be transported (10) on the end portion (2), and/or moving (105) the separator (5) from its arresting position into a releasing position, in which it no longer holds back the second item to be transported (11) on the retaining portion (3), so that the second item to be transported (11) can be moved into the end portion (2).

12. The method as claimed in claim 1, wherein a scanner of the removal device (20) checks (102), whether the first item to be transported (10) is arranged in the end portion (2) and/or whether the removal device (20) is ready for receiving the first item to be transported (11).

13. A storage system with at least one flow storage system (1) for storing items to be transported (10; 11; 12) and at least one removal device (20) for receiving at least one item to be transported (10; 11; 12) that is stored in an end portion (2) of the flow storage system (1), with:

an end stop (1), which can be arranged in an arresting position, in which it holds back at least a first item to be transported (10) on the end portion (2), and/or a separator (5), which can be arranged in an arresting position, in which it holds back at least a second item to be transported (11) on a retaining portion (3) of the flow storage system (1); and at least one sensor (21) of the removal device (20), while the removal device is in a removal position, the sensor capable of checking whether the end stop (4) and/or the separator (5) is arranged in its respective arresting position;

wherein the removal device (20) in its removal position can be arranged adjacent to the end portion (2) of the flow storage system (1) in such a way that the first item to be transported (10) can be transferred from the end portion (2) to the removal device (20).

14. The use of a sensor (21), arranged on a removal device (20), for checking whether an end stop (4) of a flow storage system (1) and/or a separator (5) of a flow storage system (1) is arranged in its respective arresting position when the removal device (20) in its removal position is arranged adjacent to an end portion (2) of the flow storage system (1), wherein the end stop (4) is arranged in its arresting position, in which it holds back at least a first item to be transported (10) on an end portion (2) of the flow storage system (1) and/or the separator (5) is arranged in its arresting position, in which it holds back at least a second item to be transported (11) on a retaining portion (3) of the flow storage system (1); and the first item to be transported (10) can be transferred from the end portion (2) of the flow storage system (1) to the removal device (20) located in its removal position.

\* \* \* \* \*